April 9, 1957   E. H. MARSHALL   2,788,511
LIGHTWEIGHT SEISMOMETER

Filed Aug. 24, 1953   3 Sheets-Sheet 1

INVENTOR.
Elbert H. Marshall
BY
Stevens, Davis, Miller & Mosher
ATTORNEYS

April 9, 1957     E. H. MARSHALL     2,788,511

LIGHTWEIGHT SEISMOMETER

Filed Aug. 24, 1953     3 Sheets-Sheet 2

INVENTOR.
Elbert H. Marshall
BY
Stevens, Davis, Miller & Mosher
ATTORNEYS

April 9, 1957　　　　E. H. MARSHALL　　　　2,788,511
LIGHTWEIGHT SEISMOMETER

Filed Aug. 24, 1953　　　　　　　　　　　　3 Sheets-Sheet 3

INVENTOR.
Elbert H. Marshall
BY
Stevens, Davis, Miller & Mosher
ATTORNEYS

United States Patent Office 2,788,511
Patented Apr. 9, 1957

2,788,511

LIGHTWEIGHT SEISMOMETER

Elbert H. Marshall, Dallas, Tex., assignor to Texas Instruments Incorporated, Dallas, Tex., a corporation of Delaware Application August 24, 1953, Serial No. 375,958

10 Claims. (Cl. 340—17)

This invention relates to a seismometer for detecting and converting physical movements of the earth into electrical signals characteristic of the physical disturbance.

As is well known from the prior art of seismic prospecting, the earth transmits waves generated by a physical disturbance, such as the explosion of a charge of dynamite, as an elastic medium. The motion resulting from the explosion can be picked up by one or more seismometers placed on or below the surface of earth. The seismometer or seismometers translate the motion into electrical impulses corresponding in amplitude and frequency to the detected movement. The type of seismometer most commonly used for this purpose is the inertia type, the operation of which is based on the principle of movement of a permanent magnet field relative to a coil of wire. In the usual construction, a coil of wire is supported resiliently by various means from a magnetic structure and the whole is enclosed within a case in contact with the earth. As the case and magnetic structure move with the seismic disturbance of the earth, the coil tends to remain stationary and cut the flux lines produced by the magnetic structure. The amplitude and frequency of the relative movement determines the rate at which the flux lines are cut and thus controls the electrical current induced in the coil. These signals are amplified and then recorded on a seismograph.

Various structures and methods for mounting the coil from the magnetic structure have been developed for seismometers of the inertia type. The coil constitutes the inertia body of these seismometers since the inertia of the coil in relation to the constant of the resilient mounting means allows it to remain comparatively stationary as the case and magnetic structure move with the earth. The suspension of the inertia body ordinarily is effected by flat spiral springs formed with three arms as the spring section. The three point suspension form of the spring permits the necessary restraint in mounting the coil without unduly interfering with external vibrations in the desired direction. It has been found, however, in using spiral springs with three or more arms that as the length of the arms decreases, the stiffness of the arms increases subjecting the arms to excessive bending stresses during vibrations and thus, early failure. Since the spiral springs are circular in form, the length of each spring arm is limited by and dependent upon the diameter and size of the seismometer. Therefore, the use of spiral springs with three or more arms is limited to seismometers of an appreciable size if the seismometer is to withstand the shocks incident to use in the field for periods of any length.

Small, lightweight seismometers have been constructed with coils mounted by a three-arm spiral spring but the spring in these constructions is able to withstand repeated vibrations for only short periods of time. Further, the coils in these seismometers are frequently supported only at the upper end with the lower end left unrestrained in a lateral direction. Consequently, the seismometer must always be placed on level ground to prevent the coil from dragging against the sides of the magnetic structure. In other seismometers in which the coil is supported at either end by a three-arm spiral spring, the coil is restrained to move only in an axial direction, but the seismometers are of such considerable size and weight that their application is restricted.

Accordingly it is an object of this invention to produce an improved form of seismometer structure which is smaller, lighter in weight, and easier to use in large seismometer spreads or in spreads employing a plurality of seismometers at each station than any seismometer structure heretofore available.

It is another object of this invention to provide a rugged and compact structure capable of withstanding greater abuse in the field than prior structures have been capable of withstanding.

Another important object is to provide coil mounting springs constructed to minimize the excessive stresses induced in the spring arms due to repeated shocks and yet maintain the resonant frequency of the coil and spring arrangement below the most common and useful range of seismic frequencies.

Still another object of the present invention is to provide a coil mounting spring arrangement characterized by considerable restraint against movement in all directions except an axial direction to allow the seismometer being placed on other than level ground without danger of the coil dragging against the magnetic structure. This additional feature of the present invention allows close tolerances to be maintained on the air gap in which the coil is mounted with a consequent increase in sensitivity.

Another object is to provide a seismometer which is entirely enclosed and sealed against the entrance of water or moisture.

Other and different objects of the present invention will be apparent from the following detailed description when taken in conjunction with the accompanying drawings in which.

Figure 1:
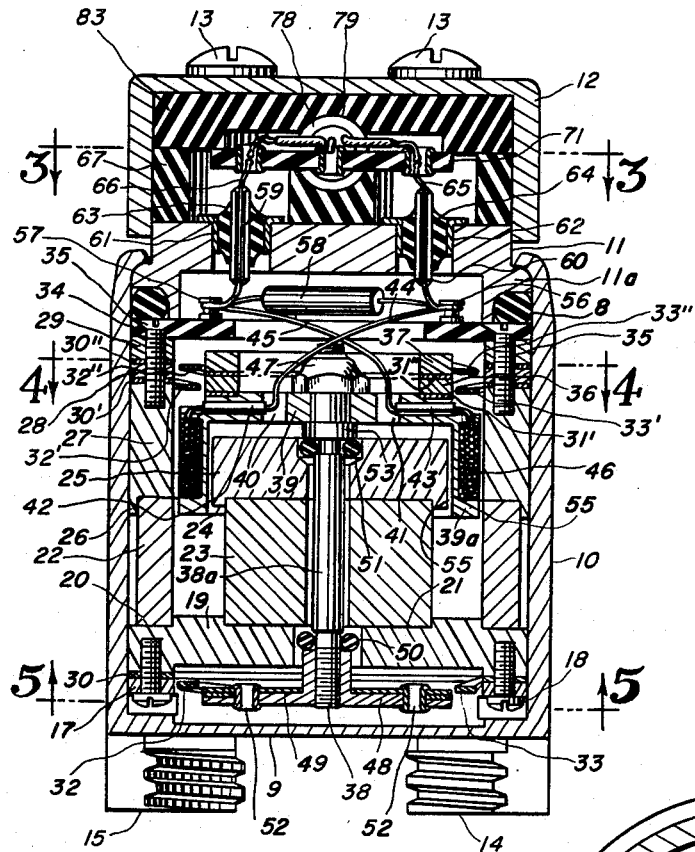
Figure 1 is a view in vertical section of the seismometer taken along line 1—1 in Figure 2.
Figure 2:
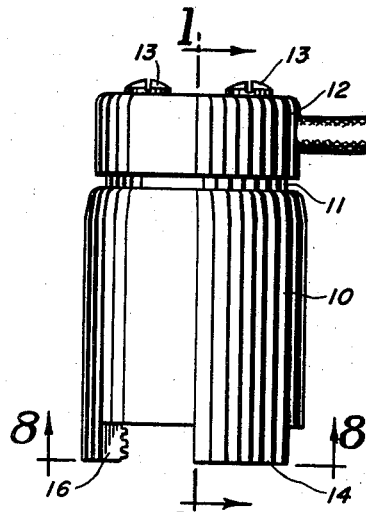
Figure 2 is a view in side elevation of the seismometer of the present invention.

Referring now to the drawings, an illustrative embodiment of the seismometer of the present invention is shown in Figures 1 and 2. A cylindrical housing 10 enclosing the operating components of the seismometer is preferably made of brass, and is closed at one end and open at the other end. The closed end is indicated by the numeral 9. The open end of housing 10 is closed by a closure 11 which is secured in place by die rolling the open end of the housing 10 over a flange 11a, a part of closure 11. A circular O-seal ring 8 is positioned underneath and between the extended flange 11a and the built-up structure within housing 10. O-seal ring 8 is compressed into an elliptical cross-section as the upper end of housing 10 is rolled around flange 11a and thus effects a water-tight and moisture-proof seal for closure 11. Cap 12 mounts on closure 11 and is secured in place by a series of screws 13. A cable 78, composed of lead wires 75 and 77 and strain wire 76, extends outside of the seismometer through an opening milled into the side of cap 12.

Figure 8:
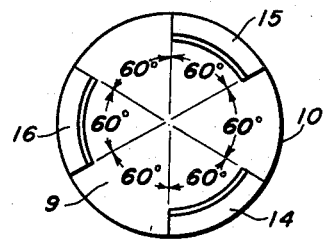
Figure 8 shows a view in bottom plan of the threaded case support projections.

Integral with housing 10 are three equally spaced, threaded support projections 14, 15 and 16 as illustrated in Figures 1, 2 and 8. In Figure 8, each projection extends along the circumference of housing 10 for a distance equal to an arc whose angle subtends an angle of 60° at the center of closed end 9 of the cylinder. Between each projection is a clear space equal to the arc length of each projection. The seismometer rests on the three support projections and earth vibrations are transmitted to the seismometer through these projections. The selection of three projections enables the seismometer to be placed on uneven ground and yet maintain a firm support. Although three projections are shown, it is not intended that this invention be limited to this exact number.

The projections are threaded to provide for the use of various attachments with the seismometer when it is to be used in loose sand, or in marshy or water covered areas. For this purpose, a modified acme thread is used because of its greater strength over conventional V threads and because the clearance inherent in the acme thread allows the threads to become nicked or damaged without preventing the use of the attachments. In modifying the standard acme thread, the crown height has been reduced to provide an even greater clearance.

Describing now in detail the assembly of the electromagnetic structure shown in Figure 1, lower ring 17 is attached to pole piece 19 by a series of screws 18. Outer ring 30 of the lower spiral spring to be discussed in subsequent paragraphs, is positioned between lower ring 17 and pole piece 19. Lower ring 17 is counterbored at each screw hole to allow a flush head screw assembly. Pole piece 19, made from a high permeability material, such as mild steel, is formed as a circular disc with a centrally located hole. The upper surface of pole piece 19 is provided with two circular recessed areas, the outer recessed area designated as 20 and the inner recessed area designated at 21. An annular permanent magnet 22, preferably an aluminum, nickel, and cobalt alloy, fits into outer recessed area 20 in pole piece 19. Permanent magnet 23, also an aluminum, nickel, and cobalt alloy, fits within the inner recessed area 21. Magnet 23 is formed as a cylinder with an axial hole. An annular pole piece 25 is recessed on its under surface to leave a rim 24 extending around the periphery of the circular pole piece. Pole piece 25 seats on permanent magnet 23 and is securely held in place by means of rim 24. A similar annular pole piece 27, formed with an enlarged opening centrally of the pole piece, is recessed on its under surface to leave a rim 26 extending around its periphery. Pole piece 27 seats on permanent magnet 22 and is securely held in position by the extended rim 26 which encloses the outer diameter of the permanent magnet 22. After the magnets and pole pieces have been assembled into position, some bonding means, such as solder, is used to maintain and fix the various parts into a complete unit.

It can be seen from the foregoing that the magnetic path is composed of a series of components each definitely related to and positioned in respect to the other pieces and that such construction leads to uniformity in construction as well as in the results obtained. Further, the use of two permanent magnets, one concentric of the other, leads to a lower reluctance magnetic flux path and consequently, a higher flux density across the air gap in which the coil of wire is mounted.

The clearance between the outside diameter of pole piece 25 and the inside diameter of pole piece 27 provides the necessary air gap to mount a coil 46. Coil 46 is wound onto and retained in a recessed area 39a provided by the circular length of a coil form 39. Coil form 39 is made from aluminum and is approximately cylindrical in form, open at the lower end and closed at the upper by a comparatively thick plate integral with the cylindrical form. The end closing plate of coil form 39 is drilled with three holes, one in the center and one on either side of center, holes 40 and 41. Two additional holes are drilled into the closure plate transverse to the axial length of the form to provide passageways from the outer circumference of the coil form inwardly to the holes drilled on either side of the center hole. Tubes 42 and 43 are inserted into these drilled passages and separate leads 44 and 45 fixed to coil 46 extend through tubes 42 and 43, respectively, and upward through the holes 40 and 41.

A rod 38 extends vertically downward through the centrally located circular area provided by the annular pole pieces 25 and 19 and magnet 23. Rod 38 is turned down at either end to provide an enlarged diameter through the middle portion of the rod as indicated by the numeral 38a. The smaller diameter portions of the rod are threaded. O-rings 50 and 51, composed of a compressible, elastic material, such as rubber, fit over either end of rod 38 and rest against the shoulder formed by the enlarged diameter 38a. At the upper end of rod 38, a support shoulder 53 rests against O-ring 51. The upper end of rod 38 passes through the central hole in coil form 39 and the coil form 39 seats against support shoulder 53. Coil form 39 is secured in position by means of a self-locking nut 47 threaded onto the upper end of rod 38. A spring mounting nut 48 threads onto the lower end of rod 38 and is stopped at a point where it rests against the under side of O-ring 50.

It can be seen from this structure that the pairs of shoulders of rod 38 fix each O-ring in position; consequently, the O-rings on contact with the magnetic structure (the undersurface of magnet 23 in the case of O-ring 50 and the reduced section of the bore in pole piece 25 in the case of O-ring 51) act as stops to limit the vertical movement of coil 46 and hence cushion the coil mounting springs against sudden impacts.

Figure 6:
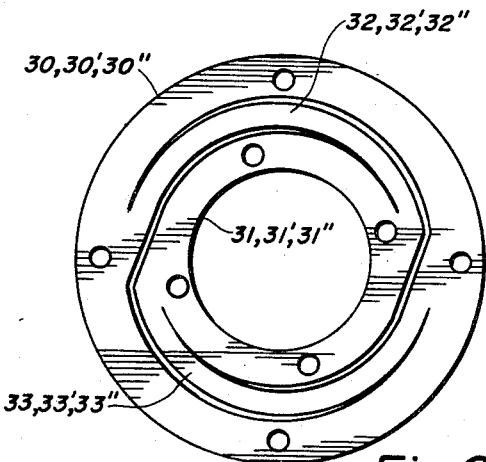
Figure 6 is a view in plan of the flat spiral spring of this invention.

The coil form and rod assembly is supported from the magnetic structure by means of three flat spiral springs, two at the top and one at the bottom. The configuration of the flat spiral springs used in this invention is shown in Figure 6. Essentially, the spring is composed of an outer ring (30, 30′, 30″) connected to an inner ring (31, 31′, 31″) by means of two arms (32, 32′, 32″ and 33, 33′, 33″). One end of each arm is integrally attached to and formed as part of the inner ring and the other end of each arm is integrally attached to and formed as part of the outer ring. The arms spiral inwardly from the outer ring to the inner ring and similar ends of the arms attach to the appropriate ring 180° apart. Further, the width of the arms is greater at their ends than at any point intermediate their ends along their length for the purpose of increased resistance to bending stresses. Although a series of spring mounting holes are formed in each ring, the holes in the inner ring are not in alignment with the holes in the outer ring. The purpose of this out-of-alignment relation between the holes is to position alternate holes in each ring at the point of maximum cross-sectional area. Since each spring is similar in configuration but located at different positions in the magnetic structure, the various components of each spring have the same numeral designation but are distinguished in location by prime exponents to the numeral. For example, the outer ring for the springs is numbered as 30, 30′, and 30″.

Figure 7:
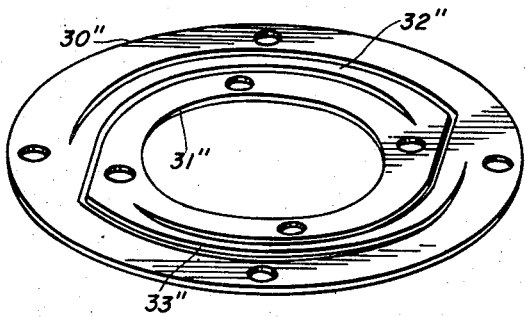
Figure 7 is a view in perspective of the relative positions of the two upper flat spiral springs.
Figure 7:
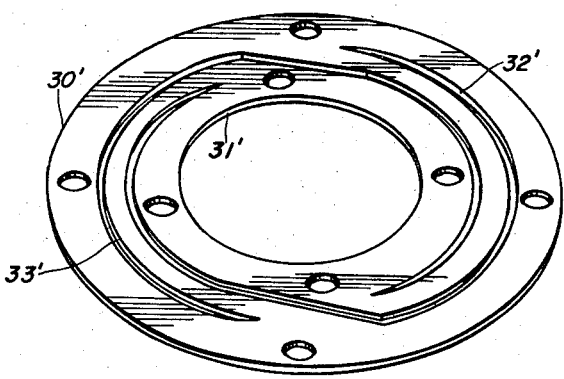

The flat spiral spring constructed as in Figure 6 constitutes an important part of the present invention. It was found early in the development of this seismometer that flat spiral springs with three arms failed after only a short time when subjected to repeated shocks. The point of failure invariably occurred either at the connection point to the outer or the inner ring indicating that excessive bending stresses were imposed at these points due to the shortened length of each arm. When the number of arms was reduced to two and their length correspondingly increased, the life of the springs was found to be materially increased. However, it was further noted in two arm springs that the resistance of the spring to horizontal thrusts was much less when the thrust was applied in a direction perpendicular to the length of the arm than when the thrust was applied in line with the length of the arm. A consideration of this factor resulted in the use of two springs arranged as shown in Figure 7 to support the upper portion of the coil form and rod assembly. As can be seen, one spring is rotated 90° from the other spring and consequently, a high resistance to horizontal thrust is provided for all directions. A similar arrangement for the lower end of the coil form and rod assembly was found to be unnecessary because of the much lower inertia of the lower end. This method of supporting the assembly allows the coil to move only in an axial direction and therefore, the seismometer may be placed on other than level ground without danger that the coil will drag against the magnetic structure and interfere with the reception of wave arrivals from a given seismic prospect.

The flat spiral springs are preferably made from beryllium copper although other materials can be used. Specifically, the thickness of the springs as used in this invention are .0065" for the two upper springs and .0085" for the lower spring. Since the compliance of the springs is inversely proportional to the width of the arm section times the cube of the depth or thickness, it can be seen that the compliance of the combined upper springs very nearly equals the compliance of the lower spring. Resonance for this spring arrangement supporting the specific mass of the coil and rod assembly occurs at 17 C. P. S., which is below the most useful band of seismic frequencies. Although a spring of the type used does not follow Hook's law for any appreciable displacement, for all practical purposes these springs do follow that law as the normal displacements thereof are of the order of a few thousandths of an inch at the most.

Figure 4:
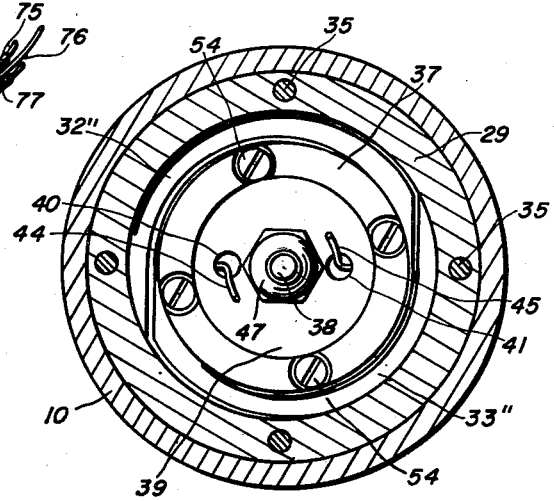
Figure 4 is a view in horizontal section of the upper spring support for the coil and signal lead arrangement taken along line 4—4 of Figure 1.

Continuing with the description of the coil support arrangement, the spring, whose outer ring is designated as 30', is placed on annular pole piece 27. Outer spacer ring 28 is placed on outer ring 30' and separates outer ring 30" from outer ring 30' as the upper spring is placed in position. Upper ring 29 is then positioned on outer ring 30" and the assembly completed by placing terminal plate 34 on upper ring 29. The flat spiral springs, outer spacer ring 28, upper ring 29 and terminal plate 34 are all provided with a series of holes which are aligned when these components are assembled. These components are firmly secured to pole piece 27 by a series of screws 35 extending through the aligned holes into holes tapped in the pole piece. Similarly, an inner spacer ring 36 corresponding in thickness to outer spacer ring 28 is placed on the inner ring 31' which falls in position over coil form 39 when the spiral spring is in place on pole piece 27. After the upper flat spiral spring is in position on inner spacer ring 36, upper spring holding ring 37 is placed on inner ring 31". The inner rings 31' and 31" of the springs, the spacer ring 36, and upper spring holding ring 37 are likewise formed with a series of holes which are aligned as the components are placed in position. As shown in Figure 4, these components are secured to the coil form 39 by a series of screws 54.

Figure 4 further illustrates the holes 40 and 41 drilled into core form 39 through which pass the leads 44 and 45 that carry the signals induced in coil 46 by the relative movement between the coil and the magnetic structure. As is clearly shown in the plan view of Figure 4, holes 40 and 41 are offset angularly from the screws 54 to provide a clear passage for the leads 44 and 45 without interfering with the screws 54 mounting the springs and spacers to the coil form.

Figure 5:
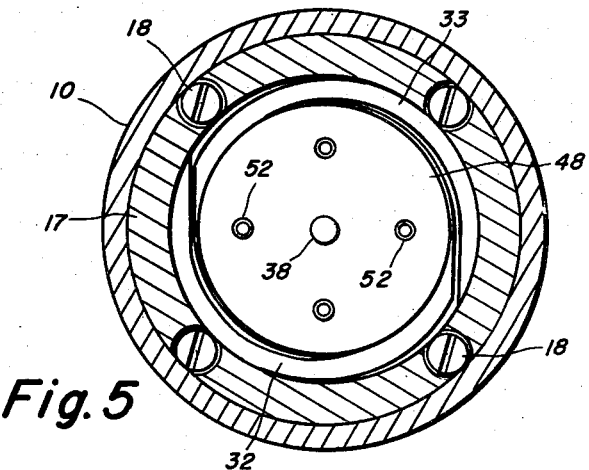
Figure 5 is a view in horizontal section taken along line 5—5 of Figure 1 showing the lower spring support for the coil.

Spring mounting nut 48 has already been described as threaded on to the lower end of rod 38 to provide a bottom shoulder support for O-ring 50. The lower spiral spring supporting and restraining rod 38 and consequently coil 46 is fixed to spring mounting nut 48 and the magnetic structure as follows. The outer ring 30 of the flat spiral spring is placed between lower ring 17 and pole piece 19 and secured in position by the screws 18. The inner ring 31 of the spring fits into a recessed flange area extending around the periphery of spring mounting nut 48. A flat annular disc 49 fits around the threaded portion of spring mounting nut 48 and covers the inner ring 31. Disc 49, inner ring 31, and spring mounting nut 48 are assembled into a complete unit by a series of eyelets 52 which in effect rivet the components together. This arrangement is further illustrated in Figure 5.

When the coil and rod are thus supported by the three flat spiral springs, coil 46 is separated from the magnetic structure by an air gap 55 on either side of the coil. The gap is not more than .010 inch in width which provides a seismometer with a high degree of sensitivity. The lateral restraint provided by the springs has been found sufficient to maintain coil 46 within the close tolerances required by air gap 55.

Leads 44 and 45 from coil 46 extend upward to terminal lugs 56 and 57, respectively, mounted on terminal plate 34. It should be observed at this point that leads 44 and 45 have a high spring compliance and consequently, little or no influence on the resonant frequency of the seismometer. A damping resistor 58 is connected in shunt across coil 46 by having its leads soldered to the terminal posts 56 and 57 and the lead wires 44 and 45. This resistor is a damping resistor and is proportioned to control the period of vibration of the coil assembly in accordance with the desired electrical characteristics of the device. Lead 44 extends upward through a tube 60 which is supported by a sleeve 62 and insulating material 64 in closure 11. The insulating material 64 used in this instance is glass to effect a water-tight seal around tube 60. Lead 44 is brought outside of tube 60 and soldered thereto to provide a suitable electrical connection as well as a seal for the open end of tube 60. A lead 65 is soldered to tube 60 and connects to an eyelet 74 mounted in terminal plate 71. Similarly, lead 45 extends through a tube 59 which is supported in closure 11 by a sleeve 61 and insulating material 63. Tube 59 is also sealed by a drop of solder and connected with eyelet 72 in terminal plate 71 by a lead 66 in like manner to lead 65. Strain member 76 is soldered to the center eyelet 73 in the terminal plate. Terminal plate 71 is supported by lower seal 67 and maintained in position by means of upper seal 83. Both lower and upper seals 67 and 83 are preferably made from an elastic and compressible material such as rubber.

Figure 3:
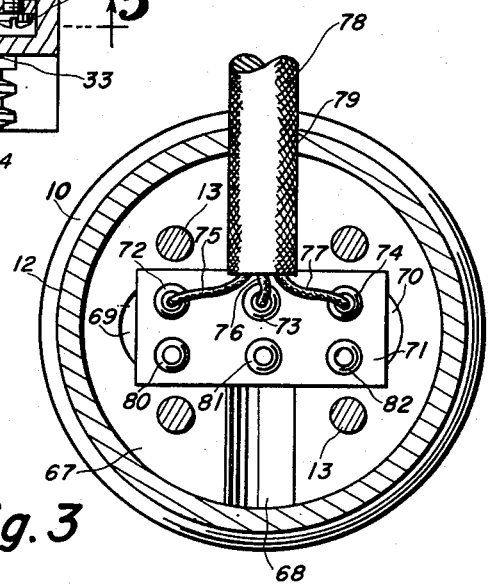
Figure 3 is a view in horizontal section of the seismometer output signal leads and the terminal plate connections taken on line 3—3 of Figure 1.

The arrangement shown in Figure 3 further illustrates the connections to the terminal plate 71 and the manner in which the leads and strain member are formed into a cable. Lower seal 67 is fabricated with a semicircular groove 68 across one diameter and two holes 69 and 70, one on either side of and along the diameter perpendicular to the semicircular groove 68. A rectangular recessed area is further provided to flush mount terminal plate 71 in lower seal 67. As described, leads 65 and 66 extend upward through the holes 70 and 69 respectively and are soldered to the underside of eyelets 74 and 72. On the upper side of terminal plate 71, lead 75 soldered to eyelet 72, lead 77 soldered to eyelet 74 and strain member 76 soldered to eyelet 73 are formed into an insulated cable 78 which extends out through the opening 79 in the side of cap 12. An additional set of three eyelets 80, 81, and 82, are mounted in terminal plate 71 should it be desired to connect the seismometer into a string of seismometers. For this purpose, semicircular groove 68 extends completely across the diameter of lower seal 67 to provide a support for the additional cable. The opening in the side of cap 12 for the through connection, similar to opening 79, is not shown. A groove similar to groove 68 is formed in the upper seal 83 to further enclose and support cable 78. Of course, screws 13 extend through holes in upper seal 83 and lower seal 67 to secure cap 12 to closure 11.

In addition to the advantages apparent from the description, there are others among which the following may be mentioned. The feature of soldering separate leads to the terminal plate eyelets allows broken cable leads to be repaired in the field simply and inexpensively by the use of only another cable lead. Further, these repairs can be made without impairing or destroying the watertight seal provided for the seismometer housing. Also, in comparison with seismometers of the prior art of approximately equal effectiveness, the subject invention weighs approximately 1¼ pounds whereas other devices weigh from 3¾ pounds upward. When it is realized that a hundred or more seismometers may be used in a single spread, the saving in weight and expense becomes considerable.

It is apparent that various changes and deviations in the structure, lead connections, and selection of materials will be obvious to those skilled in the art from the above disclosure of this invention. For this reason it is intended that the specific arrangement set forth be considered as a preferred embodiment and all changes and modifications such as are obvious to those skilled in the art be held to fall within the spirit, scope, and contemplation of this invention.

What is claimed is:

1. In a vibration actuated electro-mechanical device the combination comprising a housing, means forming an annular magnetic field structure in said housing, an annular air gap defined in said magnetic field structure, a coil in said air gap, a rod connected at one end to said coil and extending concentrically through said annular magnetic field structure, resilient means mounting one end of said coil to said magnetic field structure including two flat spiral springs each characterized by an inner ring connected to said coil, an outer ring fixed to said magnetic field structure and two spiral arms interconnecting said inner and outer rings, said springs being arranged in overlying relationship with one of said rings being rotated 90° relative to the other, and resilient means mounting the other end of said rod to said magnetic field structure including a flat spiral spring consisting of an inner ring connected to said rod, an outer ring fixed to said magnetic field structure and two spiral arms interconnecting said rings, said resilient mounting being thus arranged to maintain said coil suspended concentrically in said air gap and to allow displacement of said coil axially only.

2. In a vibration actuated electro-mechanical device the combination comprising a housing, a pair of annular permanent magnets concentrically arranged in spaced relationship within said housing, an annular pole piece mounted below said permanent magnets constituting a magnetic path from one of said magnets to the other, a pair of annular pole pieces mounted above said magnets, said pair of pole pieces being concentrically arranged in spaced relationship to define therebetween an air gap, a coil assembly consisting of a coil wound on a coil form, a rod connected at one end to said coil form extending concentrically through said magnets and pole pieces, a resilient mounting for the other end of said rod consisting of a flat spiral spring characterized by an inner ring connected to the other end of said rod, an outer ring fixed to said annular pole piece mounted below said magnets, and two spiral arms interconnecting said inner and outer rings, a resilient mounting for said coil form consisting of two flat spiral springs each characterized by an inner ring connected to said form, an outer ring fixed to said outer annular pole piece, and two spiral arms interconnecting said inner and outer rings, said two springs being arranged in overlying relationship with one of said rings rotated 90° relative to the other, said resilient mountings and said rod being thus arranged to maintain said coil assembly suspended concentrically in said air gap and to allow displacement of said coil assembly axially only.

3. In a vibration actuated electromechanical device, the combination comprising a housing, means forming an annular magnetic field structure in said housing, an annular air gap defined in said magnetic field structure, a coil in said air gap, a rod connected at one end to said coil and extending concentrically through said annular magnetic field structure, first resilient means mounting one end of said coil to said magnetic field structure including two flat spiral springs each characterized by an inner ring connected to said coil, an outer ring fixed to said magnetic field structure and two spiral arms interconnecting said inner and outer rings, said springs being arranged in overlying relationship with one of said rings being rotated 90° relative to the other, and a second resilient means mounting the other end of said rod to said magnetic field structure, the compliance of said first resilient means and said second resilient means being substantially equal, said resilient means being thus arranged to maintain said coil suspended concentrically in said air gap and to allow displacement of said coil axially only.

4. In a device as defined in claim 3 the combination wherein said second resilient means includes a spiral spring consisting of an inner ring connected to said rod, an outer ring fixed to said magnetic field structure and two spiral arms interconnecting said rings.

5. In a vibration actuated electromechanical device, the combination comprising a housing, means forming an annular magnetic field structure in said housing, an annular air gap defined in said magnetic field structure, a coil in said air gap, a rod connected at one end to said coil and extending concentrically through said annular magnetic field structure, first resilient means mounting one end of said coil to said magnetic field structure including two flat spiral springs each characterized by an inner ring connected to said coil, an outer ring fixed to said magnetic field structure and two spiral arms interconnecting said inner and outer rings, said springs being arranged in overlying relationship with one of said rings being rotated 90° relative to the other, a second resilient means mounting the other end of said rod to said magnetic field structure, resonance for said resilient means being below the band of seismic frequencies intended to be detected by the device, said resilient means being thus arranged to maintain said coil suspended concentrically in said air gap and to allow displacement of said coil axially only.

6. In a vibration actuated electromechanical device, the combination comprising means for forming a magnetic field structure, an air gap defined in said magnetic field structure, a coil in said air gap and means mounting said coil in said air gap including a pair of flat spiral springs each characterized by an inner and outer ring interconnected by two spiral arms, said springs being arranged in spaced relationship with one of said rings being rotated relative to the other thereby permitting displacement of said coil axially only.

7. In a vibration actuated electro-mechanical device the combination comprising a housing, means forming an annular magnetic field structure in said housing, an annular air gap defined in said magnetic field structure, a coil in said air gap, a rod connected at one end to said coil and extending concentrically through said annular magnetic field structure, first resilient means mounting one end of said coil to said magnetic field structure, said first resilient means including two flat spiral springs each characterized by an inner ring connected to said coil, an outer ring fixed to said magnetic field structure and two spiral arms interconnecting said inner and outer rings, said springs being arranged in overlying relationship with one of said rings being rotated 90° relative to the other, and second resilient means mounting the other end of said rod to said magnetic field structure, said resilient mountings being thus arranged to maintain said coil suspended concentrically in said air gap and to allow displacement of said coil axially only.

8. In a device as defined in claim 7 the combination wherein said resilient means mounting the other end of said rod includes a spiral spring consisting of an inner ring connected to said rod, an outer ring fixed to said means forming an annular magnetic field structure and two spiral arms interconnecting said rings.

9. In a vibration actuated electromechanical device the combination comprising a housing, a pair of annular permanent magnets concentrically arranged in spaced relationship within said housing, means forming a magnetic path bridging the lower ends of said magnets, a pair of annular pole pieces mounted on top of said magnets, said pole pieces being concentrically arranged in spaced relationship to define therebetween an air gap, a coil concentrically arranged in said air gap, a rod connected at one end to said coil and extending concentrically through said magnets and pole pieces, a resilient mounting for said coil, said resilient mounting for said coil including two flat spiral springs each characterized by an inner ring connected to said coil, an outer ring fixed to said outer annular pole piece, and two spiral arms interconnecting said inner and outer rings, said springs being arranged in overlying relationship with one of said springs being rotated 90° relative to the other, and a resilient mounting for the other end of said rod, said resilient mountings and said rod being thus arranged to maintain said coil suspended concentrically in said air gap and to allow displacement of said coil axially only.

10. In a device as defined in claim 9 the combination wherein said resilient mounting for the other end of said rod includes a spiral spring consisting of an inner ring connected to said rod, an outer ring fixed to said means forming a magnetic path and two spiral arms interconnecting said rings.

References Cited in the file of this patent

UNITED STATES PATENTS

| | | |
|---|---|---|
| 2,067,803 | Thearle | Jan. 12, 1937 |
| 2,316,616 | Powell | Apr. 13, 1943 |
| 2,348,225 | Petty | May 9, 1944 |
| 2,407,757 | MacCallum | Sept. 17, 1946 |
| 2,487,029 | Piety | Nov. 1, 1949 |
| 2,533,249 | Henson | Dec. 12, 1950 |
| 2,596,048 | Severs | May 6, 1952 |
| 2,651,769 | Stafford | Sept. 8, 1953 |
| 2,657,374 | Bardeen | Oct. 27, 1953 |
| 2,675,533 | Brown | Apr. 13, 1954 |
| 2,705,314 | Gaby | Mar. 29, 1955 |

FOREIGN PATENTS

| | | |
|---|---|---|
| 138,062 | Australia | July 21, 1950 |